US012718571B2

(12) United States Patent
Reddy et al.

(10) Patent No.: US 12,718,571 B2
(45) Date of Patent: Aug. 25, 2026

(54) DETECTING SECURITY THREATS BASED ON REAL-TIME VIDEO ANALYSIS

(71) Applicant: DELL PRODUCTS L.P., Round Rock, TX (US)

(72) Inventors: Karunakar Palicherla Reddy, Austin, TX (US); Michael S. Gatson, Austin, TX (US); Charles D. Robison, Buford, GA (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/535,878

(22) Filed: Dec. 11, 2023

(65) Prior Publication Data

US 2025/0191373 A1 Jun. 12, 2025

(51) Int. Cl.
*G06V 20/52* (2022.01)
*G06T 5/70* (2024.01)
*G06V 10/74* (2022.01)

(52) U.S. Cl.
CPC ................ *G06V 20/52* (2022.01); *G06T 5/70* (2024.01); *G06V 10/761* (2022.01); *G06T 2207/20081* (2013.01)

(58) Field of Classification Search
None
See application file for complete search history.

(56) References Cited

U.S. PATENT DOCUMENTS 7,683,929 B2 3/2010 Elazar et al.
8,272,053 B2 9/2012 Markham et al.
8,468,599 B2 6/2013 McCusker et al.
8,681,223 B2 3/2014 Howe
8,896,446 B2 11/2014 Cusack, Jr.
9,344,616 B2 5/2016 Donovan et al.
10,614,689 B2 4/2020 Bess et al.
2011/0184649 A1 7/2011 Ofek
2013/0279880 A1 10/2013 Kim et al.
2014/0063237 A1 3/2014 Stone et al.
2020/0099892 A1 3/2020 Erol et al.
2021/0200998 A1 7/2021 Ghose et al.
2022/0245288 A1* 8/2022 Anderson ............... G06F 3/017
2023/0342505 A1 10/2023 Edwards et al.
2024/0406353 A1* 12/2024 Mouridsen ............. H04N 7/188
2025/0104439 A1* 3/2025 Sundell ............. H04N 21/2187

OTHER PUBLICATIONS

Non-Final Office Action, U.S. Appl. No. 18/536,413, mailed Jun. 2, 2025, U.S. Patent and Trademark Office.

* cited by examiner

*Primary Examiner* — Samuel D Fereja
(74) *Attorney, Agent, or Firm* — Jackson Walker L.L.P.

(57) ABSTRACT

Techniques for detecting security threats based on real-time video analysis are described. One example method includes monitoring a live video feed captured by a camera of the computer system; identifying a particular security threat based on the monitored live video feed; and in response to identifying the security threat, performing one or more actions operable to address the particular security threat.

11 Claims, 3 Drawing Sheets

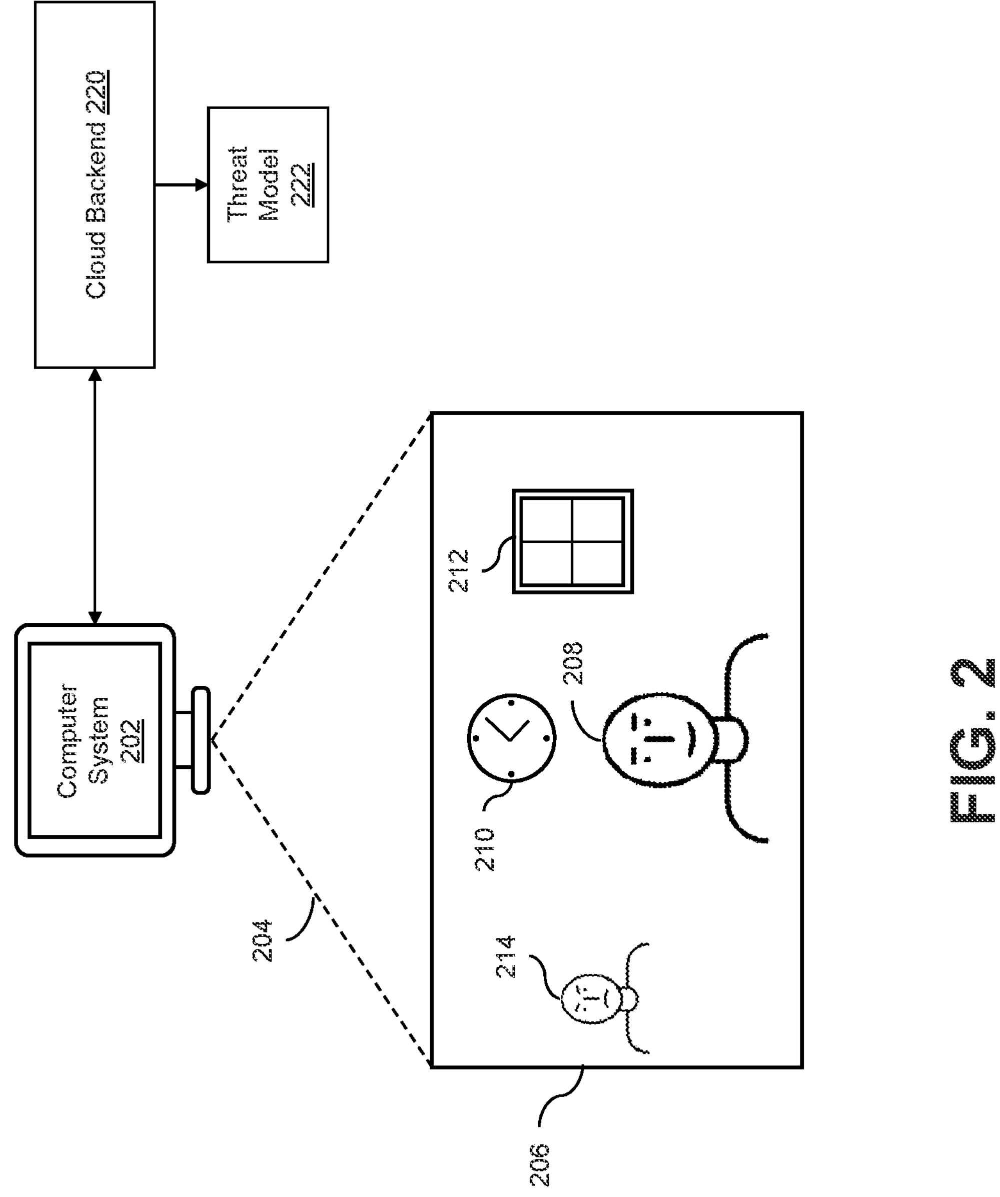
FIG. 2

DETECTING SECURITY THREATS BASED ON REAL-TIME VIDEO ANALYSIS

TECHNICAL FIELD

The present disclosure relates in general to information handling systems, and more particularly to techniques for detecting security threats based on real-time video analysis in information handling systems.

BACKGROUND OF THE INVENTION

Many computer systems can detect the physical presence of a user near the system. This ability to detect user presence can allow the system to be contextually aware of user's proximity to the system, the user's attention to the system, the environment in which the user is using the system, and other information. For example, a system can automatically wake up from a low power state in response to detecting the presence of a user, and can initiate facial recognition to verify the user's identity to quickly log them into the system. A system can also lock itself when it detects that no user is present. User presence can be detected, for example, by analyzing captured video signals from a low power camera device, audio signals from a microphone, or other signals or combinations of signals.

Presence detection techniques can also be used to detect other types of objects besides human users in proximity to the computer system. For example, the computer system may detect the presence of other objects its environment, such as other computing devices, walls and other structural components of its environment, persons speaking outside the field of view of a camera, and the like.

SUMMARY OF THE INVENTION

In accordance with embodiments of the present disclosure, a method for detecting security threats based on real-time video analysis includes monitoring a live video feed captured by a camera of the computer system; identifying a particular security threat based on the monitored live video feed; and in response to identifying the security threat, performing one or more actions operable to address the particular security threat.

In some cases, identifying the particular security threat includes matching portions of images from the live video feed to images of known security threats.

In some implementations, the method further includes sending session information to a cloud backend system, wherein the session information includes data from multiple sensors of computer system correlated with a time window in which the particular security threat was identified.

In some cases, the cloud backend is configured to train a machine learning model configured to detect security threats in live video feeds based on the session information.

In some cases, the method further includes receiving, from the cloud backend system, the machine learning model configured to detect security threats in live video feeds, wherein identifying the particular security threat is performed based on the machine learning model.

In some implementations, the particular security threat includes one or more of a person positioned to view a display of the computer system, a camera positioned to record the display, a window reflection of the display, or an unregistered smartphone in the vicinity of the display.

In some cases, the one or more actions operable to address the particular security threat include blurring a display of the computer system, notifying a user of the computer system of the particular security threat, or notifying an administrator of the computer system of the particular security threat.

In accordance with embodiments of the present disclosure, a system for detecting security threats based on real-time video analysis is configured to perform operations including monitoring a live video feed captured by a camera of the computer system; identifying a particular security threat based on the monitored live video feed; and in response to identifying the security threat, performing one or more actions operable to address the particular security threat.

In accordance with embodiments of the present disclosure, an article of manufacture includes a non-transitory, computer-readable medium having computer-executable instructions thereon that are executable by a processor of a computer system to perform operations for detecting security threats based on real-time video analysis including monitoring a live video feed captured by a camera of the computer system; identifying a particular security threat based on the monitored live video feed; and in response to identifying the security threat, performing one or more actions operable to address the particular security threat.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of example components of a system for detecting security threats based on real-time video analysis, in accordance with embodiments of the present disclosure;

DETAILED DESCRIPTION OF THE INVENTION

The present disclosure describes techniques for identifying security threats based on monitoring a real-time video feed captured by a camera of a computer system. For example, while a registered user is engaged with the computer system, another person may be viewing the display of the computer system over the user's shoulder. This eavesdropper may not be authorized to access information being displayed on the display, and thus represents a potential security threat to the user and/or the user's employer. Using user presence detection techniques, such security threats can be identified in real-time, for example based on analysis of the captured real-time video feed, and corrective action can be taken. For example, the system may notify the user of security threat, lock the system while the security threat is present, blur a display of the system while the security threat is present, or perform other actions to address the detected threat. In some cases, the system may also detect the presence of nearby listening or video capture devices, and take similar actions. Such a system may protect the user from unwanted intrusions, malicious or otherwise, and the user and its organization from potential security risks such as the unauthorized dissemination of sensitive information to unauthorized users.

Figure 1:
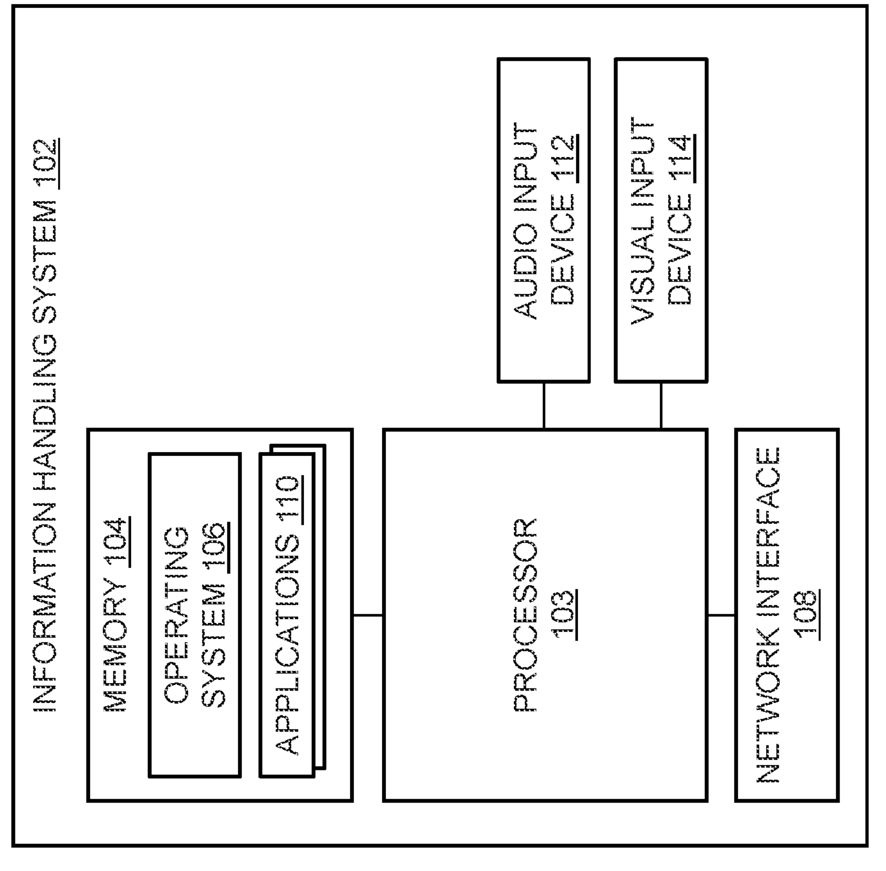
FIG. 1 illustrates a block diagram of an example information handling system, in accordance with embodiments of the present disclosure.
Figure 3:
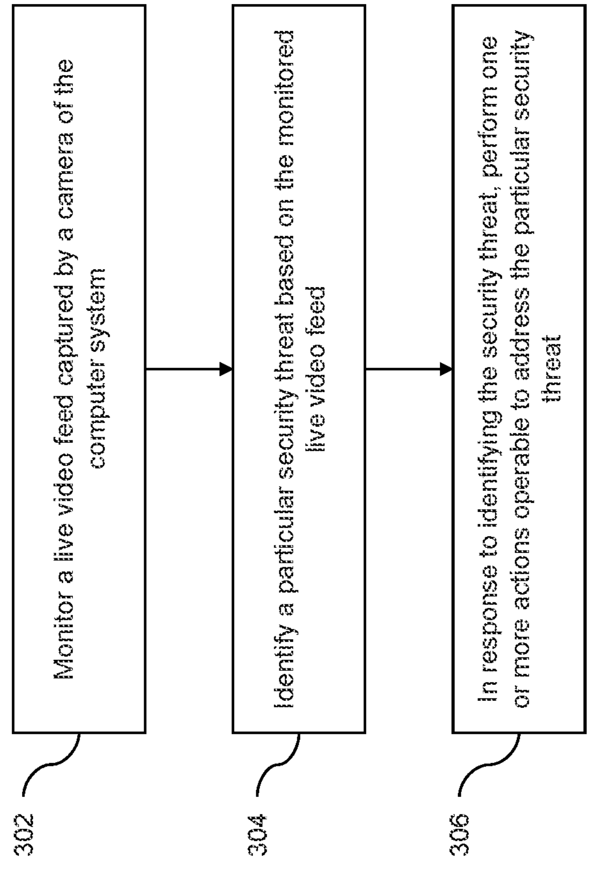
FIG. 3 illustrates a flow chart of an example process for detecting security threats based on real-time video analysis, in accordance with embodiments of the present disclosure.

Preferred embodiments and their advantages are best understood by reference to FIGS. 1 through 3, wherein like numbers are used to indicate like and corresponding parts.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, and a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Memory 104 may also have stored thereon one or more applications 110. Each of the applications 110 may comprise any program of executable instructions (or aggregation of programs of executable instructions) configured to make use of the hardware resources of the information handling system 102, such as memory, processor time, disk space, input and output devices (e.g., 112, 114), and the like. In some implementations, the applications 110 may interact with the operating system 106 to make of the hardware resources, and the operating system 106 may manage and control the access of the applications 110 to these resources (as described above).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include more than one processor 103. For example, one such processor 103 may be a CPU, and other processors 103 may include various other processing cores such as application processing units (APUs) and graphics processing units (GPUS).

Information handling system 102 further includes an audio input device 112 communicatively coupled to processor 103. Audio input device 112 can be any device (e.g., a microphone) operable to detect audible signals (i.e., sound waves) in the environment external to the information handling system 102, and convert those audible signals into electrical signals. These electrical signals representing the detected audible signals can be provided to the processor 103 where they can be analyzed and interpreted, for example at the direction of applications 110 and/or operating system 106. In some cases, the audio input device 112 can be integrated into the information handling system 102, such as in the case of a built-in microphone. The audio input device 112 may also be an external device communicatively coupled to the information handling system 102, such as an external microphone connected via Universal Serial Bus (USB).

Information handling system 102 further includes an visual input device 114 communicatively coupled to processor 103. Visual input device 114 can be any device operable to detect electromagnetic radiation, such as visible light, and convert it into representative electrical signals. These electrical signals representing the detected electromagnetic radiation can be provided to the processor 103 where they can be analyzed and interpreted, for example at the direction of applications 110 and/or operating system 106. In some cases, the visual input device 114 can be complementary metal-oxide-semiconductor (CMOS) sensor, a charge coupled device (CCD) sensor, or another type of sensor operable to detect electromagnetic radiation. In some implementations, the visual input device 114 may be configured to detect a particular range of wavelengths of electromagnetic radiation, such as the visual light range, the ultraviolet range, the infrared range, or combinations of these and other ranges. In some cases, the visual input device 114 may be a low power camera device that monitors the environment while the information handling system 102 remains in a lower power state. In some implementations, the visual input device 114 can be integrated into the information handling system 102, such as in the case of a built-in camera. The visual input device 114 may also be an external device communicatively coupled to the information handling system 102, such as an external camera connected via USB.

FIG. 2 illustrates a block diagram of a system 200 for detecting security threats based on real-time video analysis, in accordance with embodiments of the present disclosure. The system 200 includes a computer system 202, which may be similar or identical to information handling system 102 in FIG. 1. The computer system 202 includes a camera (not shown) which captures video within a field of view 204. The computer system 202 is configured to monitor this live video feed from the camera, and to identify security threats present in the scene depicted in the video. For example, the camera of computer system 202 captures video from the area in front of the display. Scene 206 represents an example image from this captured video feed. Scene 206 includes a user 208 who appears to be seated directly in front of the computer system 202. In some cases, the user 208 may be authenticated based on this video feed by a user presence detection system of computer system 202. Scene 206 also includes additional objects present in the environment of the computer system 202, including a clock 210, a window 212, and a person 214. In operation, the computer system 202 may analyze the scene 206 in the live video feed, and identify each of these features of the scene 206.

The computer system 202 may determine whether any of these features represent a security risk. For example, the computer system 202 may determine that the clock 210 poses no security risk. The computer system 202 may determine that the window 212 is a security risk, based on the potential for unauthorized persons to view the display directly through the window or to view the reflection of the display in the window. This type of unauthorized viewing of the displayed content represents security risk, because it is an unwanted dissemination of potentially confidential information. The computer system 202 may determine that the person 214 over the right shoulder of user 208 is a security risk, because the person 214 is able to view the display of the computer system 202 from their location.

In response to identifying these security threats in scene 206 of the live video feed, the computer system 202 may perform one or more actions in response to the identified security threats, including, but not limited to, blurring the display of the computer system 202, notifying a user of the computer system 202 of the identified security threats, notifying an administrator of the computer system 202 of the identified security threats, overlaying a pattern on the displayed images ("texturizing") in order to render the display difficult to read from a distance, or any action operable to mitigate or address the identified security threats.

As shown, system 200 also includes a cloud backend 220 and a threat model 222. In some cases, the computer system 202, in response to identifying a security threat, may send to the cloud backend 220 over a network (not shown) session information including data from multiple sensor modalities correlated with the time window in which the security threats were identified. Upon receiving this session information, the cloud backend 220 may use the session information to train threat model 222, which may be a machine learning (ML) configured to identify security threats from a live video feed. In some implementations, the cloud backend 220 may periodically provide a representation of the threat model 222 to the computer system 202. In such cases, the computer system 202 may identify the security threats in the live video feed by utilizing the threat model 222.

FIG. 3 illustrates a flow chart of an example process 300 for detecting security threats based on real-time video analysis, in accordance with embodiments of the present disclosure. In some implementations, the process 300 may be performed by a computing device, such as, for example, the computer system 202 of FIG. 2 or the information handling system 102 of FIG. 1.

At 302, a live video feed captured by a camera of the computer system is monitored. At 304, a particular security threat is identified based on the monitored live video feed. At 306, in response to identifying the security threat, one or more actions are performed that are operable to address the particular security threat.

In some cases, identifying the particular security threat includes matching portions of images from the live video feed to images of known security threats.

In some implementations, the process 300 further includes sending session information to a cloud backend system, wherein the session information includes data from multiple sensors of computer system correlated with a time window in which the particular security threat was identified.

In some cases, the cloud backend is configured to train a machine learning model configured to detect security threats in live video feeds based on the session information.

In some cases, the process 300 further includes receiving, from the cloud backend system, the machine learning model configured to detect security threats in live video feeds, wherein identifying the particular security threat is performed based on the machine learning model.

In some implementations, the particular security threat includes one or more of a person positioned to view a display of the computer system, a camera positioned to record the display, a window reflection of the display, or an unregistered smartphone in the vicinity of the display.

In some cases, the one or more actions operable to address the particular security threat include blurring a display of the computer system, notifying a user of the computer system of the particular security threat, or notifying an administrator of the computer system of the particular security threat.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes s of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method comprising:

monitoring, by a computer system including at least one processor, a live video feed captured by a camera of the computer system;

sending, by the computer system via a network, session information to a cloud backend system, wherein the session information includes data from multiple sensors of the computer system correlated with a time window in which a particular security threat was identified, wherein the cloud backend is configured to train a machine learning model configured to detect security threats in live video feeds based on the session information;

receiving, by the computer system from the cloud backend system, the machine learning model configured to detect security threats in live video feeds;

identifying, by the computer system, the particular security threat based on the monitored live video feed, wherein the particular security threat includes a person other than an authorized user of the computer system being positioned to view a display of the computer system, and wherein identifying the particular security threat is performed based on the received machine learning model; and in response to identifying the particular security threat, performing, by the computer system, one or more actions operable to address the particular security threat, wherein the one or more actions operable to address the particular security threat include blurring the display of the computer system.

2. The method of claim 1, wherein identifying the particular security threat includes matching, by the computer system, portions of images from the live video feed to images of known security threats.

3. The method of claim 1, wherein the particular security threat further includes one or more of a camera positioned to record the display, a window reflection of the display, or an unregistered smartphone in the vicinity of the display.

4. The method of claim 1, wherein the one or more actions operable to address the particular security threat further include notifying the authorized user of the computer system of the particular security threat, or notifying an administrator of the computer system of the particular security threat.

5. A system comprising:

a computer system including at least one processor and a memory, and configured to perform operations including:

monitoring a live video feed captured by a camera of the computer system;

sending session information to a cloud backend system, wherein the session information includes data from multiple sensors of the computer system correlated with a time window in which a particular security threat was identified, wherein the cloud backend is configured to train a machine learning model configured to detect security threats in live video feeds based on the session information;

receiving, from the cloud backend system, the machine learning model configured to detect security threats in live video feeds;

identifying the particular security threat based on the monitored live video feed, wherein the particular security threat includes a person other than an authorized user of the computer system being positioned to view a display of the computer system, and wherein identifying the particular security threat is performed based on the received machine learning model; and in response to identifying the particular security threat, performing one or more actions operable to address the particular security threat, wherein the one or more actions operable to address the particular security threat include blurring the display of the computer system.

6. The system of claim 5, wherein identifying the particular security threat includes matching portions of images from the live video feed to images of known security threats.

7. The system of claim 5, wherein the particular security threat further includes one or more of a camera positioned to record the display, a window reflection of the display, or an unregistered smartphone in the vicinity of the display.

8. The system of claim 5, wherein the one or more actions operable to address the particular security threat further include notifying a user of the computer system of the particular security threat, or notifying an administrator of the computer system of the particular security threat.

9. An article of manufacture comprising a non-transitory, computer-readable medium having computer-executable instructions thereon that are executable by a processor of a computer system to perform operations comprising:

monitoring a live video feed captured by a camera of the computer system;

sending session information to a cloud backend system, wherein the session information includes data from multiple sensors of the computer system correlated with a time window in which a particular security threat was identified, wherein the cloud backend is configured to train a machine learning model configured to detect security threats in live video feeds based on the session information;

receiving, from the cloud backend system, the machine learning model configured to detect security threats in live video feeds;

identifying the particular security threat based on the monitored live video feed, wherein the particular security threat includes a person other than an authorized user of the computer system being positioned to view a display of the computer system, and wherein identifying the particular security threat is performed based on the received machine learning model; and in response to identifying the particular security threat, performing one or more actions operable to address the particular security threat, wherein the one or more actions operable to address the particular security threat include blurring the display of the computer system.

10. The article of claim 9, wherein identifying the particular security threat includes matching portions of images from the live video feed to images of known security threats.

11. The article of claim 9, wherein the particular security threat further includes one or more of a camera positioned to record the display, a window reflection of the display, or an unregistered smartphone in the vicinity of the display.

* * * * *